US010521330B2

(12) United States Patent
Tsantilis

(10) Patent No.: US 10,521,330 B2
(45) Date of Patent: Dec. 31, 2019

(54) SIMULATION OF AUTHORIZATION CHECKS USING A DEBUGGER

(71) Applicant: SAP SE, Walldorf (DE)

(72) Inventor: Efstratios Tsantilis, Pfinztal (DE)

(73) Assignee: SAP SE, Walldorf (DE)

( * ) Notice: Subject to any disclaimer, the term of this patent is extended or adjusted under 35 U.S.C. 154(b) by 146 days.

(21) Appl. No.: 15/337,822

(22) Filed: Oct. 28, 2016

(65) Prior Publication Data

US 2018/0121328 A1  May 3, 2018

(51) Int. Cl.
G06F 11/36 (2006.01)

(52) U.S. Cl.
CPC ........ G06F 11/3664 (2013.01); G06F 11/362 (2013.01); G06F 11/3636 (2013.01); G06F 11/3668 (2013.01)

(58) Field of Classification Search
CPC .................. G06F 11/36–3696; G06F 8/41–49
See application file for complete search history.

(56) References Cited

U.S. PATENT DOCUMENTS

| | | | | |
|---|---|---|---|---|
| 5,140,671 | A * | 8/1992 | Hayes | G06F 11/362 706/45 |
| 7,849,292 | B1 * | 12/2010 | Ashcraft | G06F 9/3017 712/220 |
| 9,811,248 | B1 * | 11/2017 | Berg | G06F 11/3006 |
| 2005/0149344 | A1 * | 7/2005 | Wachholz-Prill | G06Q 10/06 705/348 |
| 2005/0283675 | A1 * | 12/2005 | Krebs | G06F 9/453 714/38.1 |
| 2007/0157174 | A1 * | 7/2007 | Gebhardt | G06F 11/3624 717/124 |
| 2007/0168753 | A1 * | 7/2007 | Herter | G06F 11/0709 714/42 |
| 2010/0306818 | A1 * | 12/2010 | Li et al. | G06F 17/3092 726/1 |

(Continued)

OTHER PUBLICATIONS

Caetano Almeida, "How to analyze authorization issues in debug", https://blogs.sap.com/2014/03/19/how-to-analyze-authorization-issues-in-debug/, Published Mar. 19, 2014. Retrieved Mar. 25, 2019. (Year: 2014).*

(Continued)

*Primary Examiner* — Doon Y Chow
*Assistant Examiner* — Joanne G Macasiano
(74) *Attorney, Agent, or Firm* — Schwegman Lundberg & Woessner, P.A.

(57) ABSTRACT

For each statement of an application executing in a debugger script-controlled debugger session, if the statement comprises an authorization check for a user in regard to an object, and if the debugger includes a set of authorization rules associated with the object, then execution of the application is discontinued. Application values for each data field of the object are obtained. These values are compared to respective values specified by each rule of the set of authorization rules. If the current values do not match values specified by at least one of the rules, the authorization check is executed normally. If the current values do match values specified by at least one of the rules, then: the authorization check is skipped, a pass or fail value for the authorization check is registered by the executing application according to the at least one rule, and execution of the application continues normally.

20 Claims, 9 Drawing Sheets

(56) References Cited

U.S. PATENT DOCUMENTS

2012/0017280 A1* 1/2012 Wiegenstein ....... G06F 11/3604
726/25
2015/0150094 A1* 5/2015 Foebel .............. G06F 17/30371
726/4

OTHER PUBLICATIONS

Brian O'Neill, "Skip the Authority Check with the ABAP Debugger Script", https://blogs.sap.com/2013/03/22/skip-the-authority-check-with-the-abap-debugger-script/, Published Mar. 22, 2013. Retrieved Mar. 25, 2019. (Year: 2013).*

Moxon, Peter. "Beginners guide to SAP ABAP." Published by: SAPPROUK Limited Copyright (2012). (Year: 2012).*

Cristea, Daniela, et al. "Development objects and algorithms required to implement a new method of access control to physical resources, based on qualifications." WSEAS Transactions on Systems and Control 5.4 (2010): p. 228-237. (Year: 2010).*

\* cited by examiner

SIMULATION OF AUTHORIZATION CHECKS USING A DEBUGGER

TECHNICAL FIELD

The present disclosure relates generally to testing software applications and, in particular embodiments, to using a debugger to assist in simulating user authorization scenarios in software applications.

BACKGROUND

The process of locating, analyzing, and fixing suspected errors in the code of a software application is referred to as "debugging." A second software application commonly known as a "debugger" is often used to debug the first software application, which executes under the control of the debugger.

Although debuggers can support a wide range of features, they typically support two primary operations to perform the debugging. A first operation supported by standard debuggers is a "stepping" function, which permits the debugger to execute the instructions (also known as "statements") of a software application one at a time, and display/analyze the results upon completion of each instruction. While the stepping function can provide a user with large amounts of information about the software application during its execution, stepping through several hundred or even several thousand instructions can be very time consuming, and may result in the user stepping through many software application instructions that are clearly error-free before arriving at the instructions the user desires to analyze and/or fix.

In this regard, a second function supported by debuggers is a "breakpoint" function, which permits the user to use a breakpoint to indicate a specific statement of the software application at which the execution of the software application should be stopped. In this way, when the software application is executed by the debugger, the software application executes in a normal manner until such a breakpoint is reached, and then stops executing and displays the results of the software application to the user for analysis.

Therefore, the stepping function and breakpoint functions may be used together to implement a debugging process as follows. Breakpoints are provided just before locations in the code of the software application that include a set of statements that the user wants to analyze, and then the software application is executed in a normal manner. Once a first such breakpoint is reached, the software application is halted, and the stepping function is used to execute the set of statements line by line in order to investigate the results of each statement separately. As a result, the user is able to quickly isolate and analyze a particular statement without having to use the stepping function to step through irrelevant statements of the software application.

The functionality of a debugger may be extended using a script to modify the debugger workflow. A script is a series of commands within a file (e.g., text file) that is capable of being executed by a computer without being compiled. A script is written in a scripting language, for example JavaScript which is a client side scripting language. The debugger application may define certain points (or these may be defined at a system level) during the debugger runtime wherein a user may add their own processing steps (e.g. calling a script). These entry points, which are called hooks, may be defined to allow for execution of custom operations based on specified constraints (e.g., rules) being satisfied during execution of the debugger application. For example, a hook may be automatically triggered before (prehook), after (posthook), or after an error (errorhook) of a normal operation (such as a debugger start/stop at a breakpoint).

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
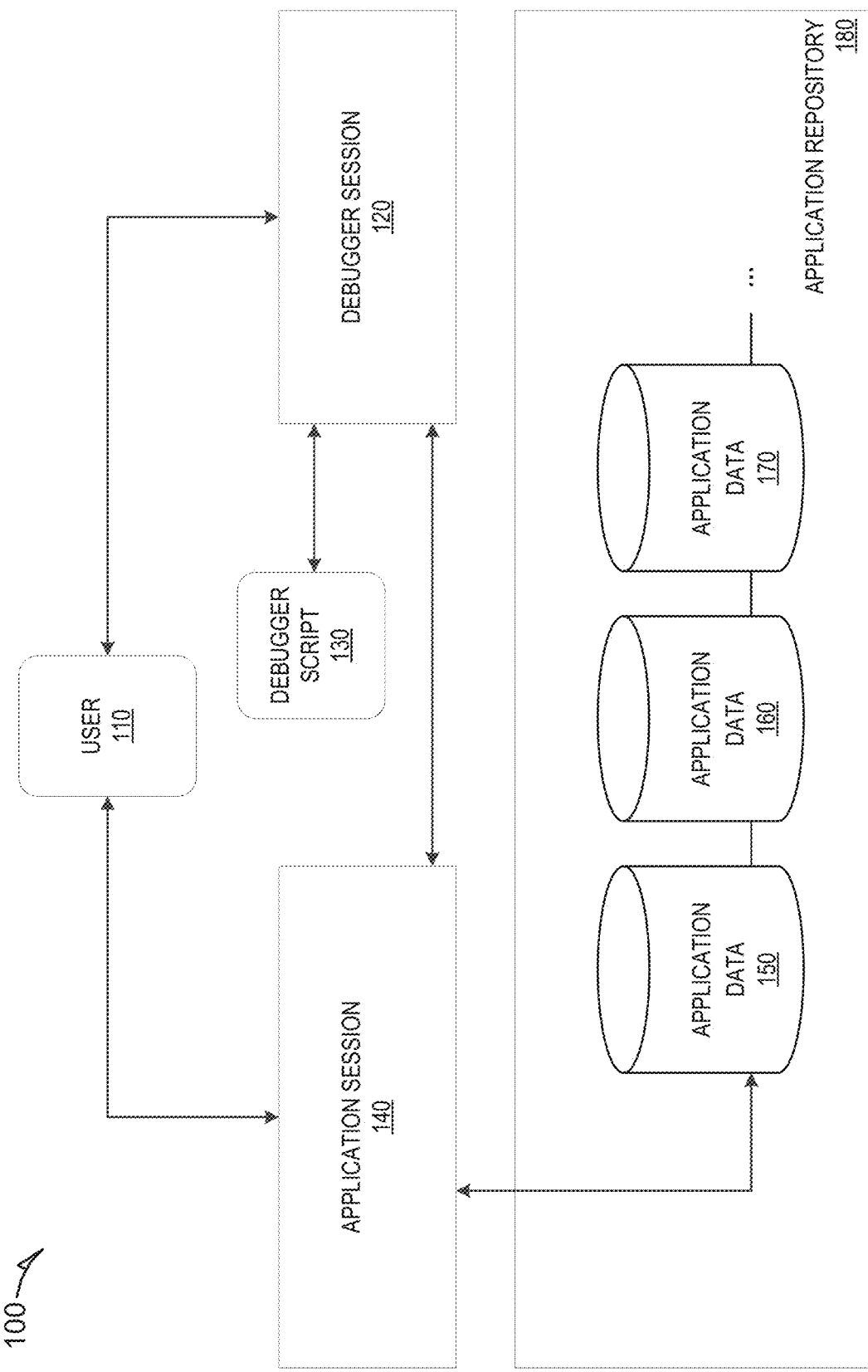
FIG. 1 is a block diagram of a data flow of a system, consistent with some embodiments, configured to use a debugger script controlled debugger session to assist in simulating application user authorization scenarios.

Testing certain software applications can become complicated when the user wants to test a scenario that includes operations for which the user has too much or not enough authorization to perform. When this occurs, it may be too difficult and/or time consuming to avoid or trigger the necessary authorization checks by modifying the user's system level credentials in the computing system where the software application is being tested. For example, a system using advanced business application programming ((ABAP) as developed by SAP AG, Walldorf. Germany) requires a user to have certain system level credentials in order to perform certain operations. The ABAP statement AUTHORITY-CHECK is used throughout all ABAP-based applications to ensure that the logged-on user has sufficient authorization to execute certain activities or functions in regard to a software object (e.g., the authority object). The authority-check statement checks the corresponding user authorization profile at the kernel level, using the given parameters of the authority object of the corresponding authority-check statement and returning a return code (sy-subrc) with a value of 0 when the authority-check is successful, otherwise a value of 4 when the authority-check is not successful. The executing application evaluates the return code and executes or aborts the checked function depending on the return code value.

The ABAP authority-check statement has a strict structure which corresponds to the data fields of the authority object for which the check is being made. For example, the authority object 'S_DEVELOP' is often checked within the ABAP Workbench with the statement:

| AUTHORITY-CHECK OBJECT 'S_DEVELOP' | |
| --- | --- |
| ID 'DEVCLASS' | FIELD p_s_develop-devclass |
| ID 'OBJTYPE' | FIELD p_s_develop-objtype |
| ID 'OBJNAME' | FIELD p_s_develop-objname |
| ID 'P_GROUP' | DUMMY |
| ID 'ACTVT' | FIELD 1_develop_actvt. |

The relevant IDs fields for the authority object 'S_DEVELOP' are defined in the ABAP system repository. A "dummy" entry, such as the entry for the ID 'P_GROUP' field, indicates that the corresponding ID is not being considered for this authority-check occurrence. The dummy entry is needed, however, to indicate that a defined ID field of the authority object 'S_DEVELOP' has not been forgotten but is instead being intentionally ignored for this occurrence of an authority-check.

Embodiments described herein provide for accessing an application, comprising statements and objects, and executing the application one statement at a time (e.g., stepping) in a debugging session using a debugger. A debugger script may be launched to control the debugging session (e.g., by a user) to, for each statement of the application, use a breakpoint to pause the execution of the application if the statement comprises an authorization check for the user in regard to an object. If the next statement does not comprise an authorization check, the statement is executed normally and execution of the application continues to a next statement. If the statement does comprise an authorization check for a user in regard to an object, the execution of the application is paused (e.g., breakpoint) in order to check (e.g., using the debugger script as described below) whether parameters of the authorization check match those of at least one rule of a rule set associated with an element of the authorization check, such as the user or the object of the authorization check.

When an authorization check for the user in regard to an object is reached during execution of the application, the debugger script may be called to determine whether the debugger (or system in which debugger is executing) includes a set of authorization rules associated with the authority object. If not, then the authorization check is executed normally, and execution of the application continues to a next statement. If it is determined that the debugger does include a set of authorization rules associated with the authority object, then a data structure of the object is accessed (e.g., from a system repository) by the script, the data structure comprising a set of data fields (e.g., ID fields) for specified data types (e.g., numeric or text). Current values for each of the data fields, of the set of data fields of the authority object, in the executing application are then accessed (e.g., from application variable in a memory stack or heap) and compared to the respective values specified by each rule of the set of authorization rules associated with the authority object. If there is a match, then the result of the authorization check is manipulated by the script according to the matching rule.

In an embodiment, execution of the application is modified (e.g., error message displayed) based on a fail value (e.g., subrc=4) being registered for the authorization check for the user in regard to the object as a result of applying a matching rule.

In an embodiment, at least one of the respective values specified by a rule, of the set of authorization rules, may comprise a range of values. Additionally, at least one of the respective values specified by a rule, of the set of authorization rules, may comprise a dummy value indicating that the corresponding ID field is not being considered for this instance of an authorization check. As noted above, these dummy entries are needed to indicate that a corresponding ID field of the authority object has not been forgotten and is intentionally being ignored for application of the rule.

In an embodiment, each of the rules in the set of rules associated with the authority object may be assigned a priority value. The debugger script can then compare the current values for each of the data fields of the authority object to respective values specified by each rule in the set of rules associated with the authority object in order according to the priority value for each rule of the rules. In this way, when the current values for each of the data fields of the authority object match the values specified by a first matching rule (in the order of priority) of the set of rules, the result of the authorization check can be manipulated according to said first matching rule without having to compare the current values to any other values specified by the other rules of the set of rules.

In an embodiment, the system (e.g., ABAP system) includes functionality (e.g., ABAP Trace) for generating a log associated with the execution of the application in the debugging session. The log may contain entries for:

each statement of the application comprising an authorization check for a user in regard to an object of the application wherein the debugger did not include a set of authorization rules associated with the object;

each statement of the application comprising an authorization check for a user in regard to an object of the application wherein the debugger does include a set of authorization rules associated with the object, but current values of the data fields of the object did not match values specified by at least one of the rules of the set of rules; and/or each statement of the application comprising an authorization check for a user in regard to an object of the application wherein the debugger does include a set of authorization rules associated with the object, the current values of the data fields of the object did match values specified by at least one of the rules, and a pass or fail value has been registered for the authorization check in the executing application according to the at least one matching rule.

In an embodiment, the system may access source code for the application and insert a script-point into the source code (e.g., at a determined location) to act as a hook for a debugger script controlled debugger session during execution of the application. The modified source code including the script-point can then be compiled into an executable application. The executable application can then be executed normally (e.g., not in a debugging session) and a debugger script controlled debugger session (e.g., as specified by the script-point) will be independently launched in the background (e.g., not in a visible user interface) when the script-point is reached during the execution of the executable application. The launched debugger script controlled debugger session may then process (as described above) the authorization checks encountered during execution of the application in the debugger session.

In some embodiments (e.g. when dealing with a web service based application or a batch process) it might be difficult or even impossible to add a script-point to the application source code. In these situations, the script can be activated at a system runtime level. For example, the debugger script may be called based on certain specified process properties, such as an associated user, client, process type (e.g., background process), server, etc. The decision to call the script may be based on rules, e.g., when the specified properties are met the script is started within an independently launched debugger session. Additional properties may be used to restrict the use of the debugger script controlled debugger session, such as an expiration date/time or a maximum number of debugger script controlled debugger session launches.

System Architecture

FIG. 1 is a block diagram of a data flow of a system 100, consistent with some embodiments, configured to use a debugger script controlled debugger session to assist in simulating application user authorization scenarios.

The user 110 may initiate tests, via a debugger session 120 (e.g., hosted by servers of system 100), of an application executing in application session 140. Application data 150 (or 160, 170, etc.) associated with application session 140 is accessed from application repository 180. The accessed application data 150 comprises the application (e.g., an ABAP application), software objects (e.g., instances of a class) and statements (e.g., instructions) for manipulating the objects to obtain a desired result. To gain access to the data in the application repository 180 (e.g., access to the application and corresponding set of statements and objects), the user 110 must have an appropriate user ID and profile in system 100. The profile contains information indicating the statements and objects to which the user 110 is permitted access in the system 100. This can become an issue when user 110 is simply a programmer attempting to test software rather than a standard user of system 100 with an existing user ID and profile in system 100.

In this regard, the user 110 begins debugger session 120 in order to test the application associated with application data 150 of application repository 180. The debugger session 120 controls application session 140 to execute the application associated with application data 150. The user 110 may manually load and start a debugger script 130 to automate certain operations within the debugger session 120. If the debugger session 120 ends (e.g., after termination of the application session 140), the user 110 will have to restart the debugger session 120 and the debugger script 130. This is because the debugger script 130 is a small application that runs within the debugger session 120 in order to execute debugger interactions with the application session 140 on an application level. For example, the debugger script 130 may control the debugger session 120 so that the application session 140 executes in a normal manner until a breakpoint is reached, and then stops executing and displays current values of application variables to user 110 for analysis or performs operations (e.g., return authorization check value) based on the current values. The debugger script 130 may use the functionalities of debugger session 120 to control the execution of application session 140, for example, by using the stepping function and breakpoint functions (described above) together to implement a debugging process as follows.

During the normal execution of application session 140, the debugger script 130 may be called (in debugger session 120) at breakpoints located just before authorization check statements in the application code processed in application session 140. Once a first such breakpoint is reached, the application session 140 is halted, and the stepping function is used by debugger script 130 to execute the authorization check according to a set of debugger script rules regarding authorization checks. In this way, the user 110 is able to manipulate the result of the authorization check in order to continue testing in application session 140 without having to modify any system-level ID and/or profile as might otherwise be required to perform the test.

The debugger script 130 can use the set of rules to evaluate an authorization check at a breakpoint in the execution of the application session 140. For example, the rule may require that a variable of an object used in application session 140 have a specified current value at the time that a corresponding breakpoint is reached in the execution of application session 140. The debugger script 130 (e.g., according to an expression provided by the user 110) can access the current values of the variables, and if while the application session 140 is executing the expression evaluates to true, the debugger script 130 can: stop the execution of application session 140, read and/or write variables of application session 140, execute step commands (into, over, out, etc.) or perform tracing/logging.

Data Structures

Figure 2:
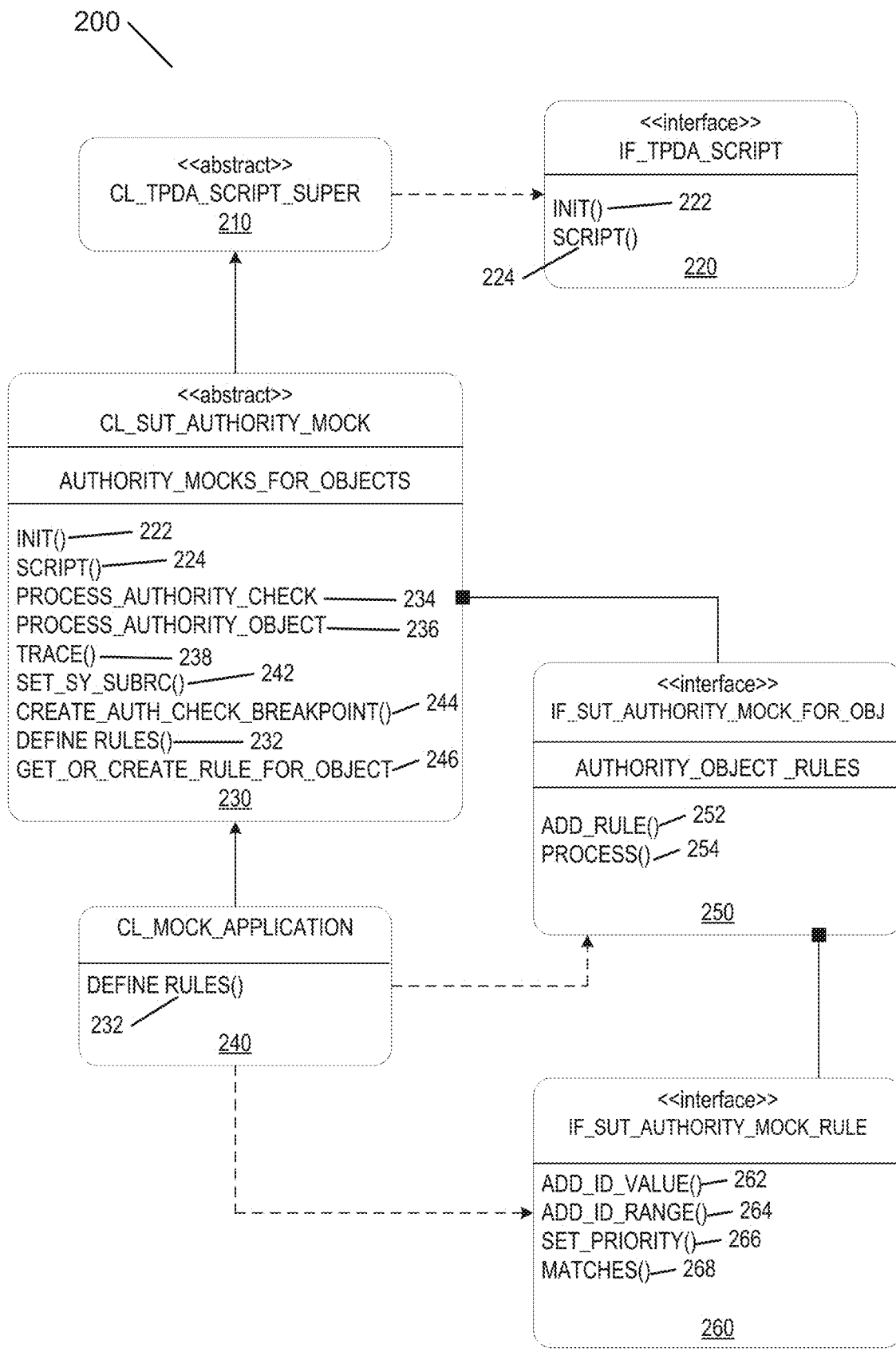
FIG. 2 is a diagram of data structures, consistent with some embodiments, for implementing the use of a debugger script controlled debugger session to assist in simulating application user authorization scenarios.

FIG. 2 is a diagram of data structures 200, consistent with some embodiments, for implementing the use of a a debugger script controlled debugger session to assist in simulating application user authorization scenarios. As noted above, an application (e.g., an ABAP application) may comprise software objects and statements (e.g., instructions) for manipulating the objects to obtain a desired result. An object is an instance of a class, and may be called a class instance or class object. However, not all classes can be instantiated. An abstract class cannot be instantiated, while classes that can be instantiated are called concrete classes.

The abstract class CL_SUT_AUTHORITY_MOCK 230 inherits from the abstract super class CL_TPDA_SCRIPT_SUPER 210 and represents an (abstract) implementation of a debugger script with one specification/extension method DEFINE_RULES 232 for implementing application classes. DEFINE_RULES 232 offers a method to define rules (e.g., authorization rules) for specified authorization objects. The rules may be defined based on data fields of the authority objects and assumed/expected values or combinations of values in different application execution scenarios.

The debugger script abstract super class CL_TPDA_SCRIPT_SUPER 210 implements an interface IF_TPDA_SCRIPT 220. In ABAP, interfaces are independent structures that extend the scope of a class. The interface IF_TPDA_SCRIPT 220 implements two methods: INIT( ) 222 and SCRIPT( ) 224. The INIT( ) 222 method is called once when the script is launched and can be used to define the trigger points (e.g., breakpoints) of the script. In this case, this method is implemented by the abstract super class CL_SUT_AUTHORITY_MOCK 230, which defines one trigger point (statement-breakpoint for "authority-check") and calls the abstract method DEFINE_RULES 232 for the subclass CL_MOCK_APPLICATION 240, which represents the application. The SCRIPT( ) 224 method is called each time the debugger "stops" (e.g., at a breakpoint) after the script has been launched. The method SCRIPT( ) 224 can be used to perform the steps/actions that the script is defined for. For example, read/change variable values, check the code or stack position, execute step commands (into, over, out, etc.) and/or perform tracing. In this case, this method is implemented by the abstract class CL_SUT_AUTHORITY_MOCK 230, which evaluates and processes the previously defined rules.

The abstract superclass CL_SUT_AUTHORITY_MOCK 230 hooks to the ABAP "authority-check" statement in the following way: a "statement breakpoint" is created/injected for "authority-check" in order to effect intermediate interruption of the executed application and trigger script execution when the authority-check statement is about to be executed (e.g., in application session 140 of FIG. 1). When the script is called (e.g., an authority check statement has been reached), it analyzes the authority-check statement at the current cursor position and determines the authority object (e.g., S_DEVELOP as described above), ID fields for the authority object and the current ID fields values list, where variables used by the authority object are converted and replaced by their current values in the executing application.

This information (e.g., the current values for the ID fields in the executing application) is matched against a rule set that has been defined/injected in the corresponding debugger script within the (abstract) method DEFINE_RULES 232 that is implemented by the CL_MOCK_APPLICATION 240. The defined rule set specifies which authority-check statements are to be "manipulated" to behave as demanded for the authorization simulation use case of the testing scenario.

For example, the set of authorization rules associated with the authority object 'S_DEVELOP' may be defined in the following way. The application class CL_MOCK_APPLICATION 240 inherits from an abstract super class CL_SUT_AUTHORITY_MOCK 230:

the respective field (indicated by the '*' required value), then the authority-check statement will be manipulated to return a pass value (e.g., subrc=0). On the other hand, if the ID field 'OBJNAME' has a value='A*' (e.g., begins with an "A" followed by any other value in the range of possible values), the ID field 'OBJTYPE' has a value='PROG', and the other ID fields have any values in the range specified by the respective field (indicated by the '*' required value), then the authority-check statement will be manipulated to return a fail value (e.g., subrc=4).

If the current values of the fields authority object do not match values specified by at least one of the rules of the set of authorization rules, the authorization check may be executed normally and execution of the application may then continue normally. However, if the current values of the fields authority object do match values specified by at least one of the rules of the set of authorization rules, then the authorization check is manipulated to return a desired result according to the at least one matching rule by: skipping over the authorization check in regard to the object using the debugger stepping function; registering a pass or fail value (e.g., subrc=0 or 4) for the authorization check in the executing application according to the at least one matching rule; and then continuing execution of the application to the next statement in the application.

Interfaces IF_SUT_AUTHORITY_MOCK_FOR_OBJ 250 and IF_SUT_AUTHORITY_MOCK_RULE 260 for the application class CL_MOCK_APPLICATION 240 are used to implement the rules, including adding the rules (using method ADD_RULE( ) 252), adding ID field values or value ranges (using ADD_ID_VALUE( ) 262 or ADD_ID_RANGE( ) 264), setting the priority for each rule

```
CLASS cl_mock_application DEFINITION INHERITING FROM
cl_sut_authority_mock.
       PUBLIC SECTION.
       PROTECTED SECTION.
              METHODS:
              define_rules     REDEFINITION. "redefine the abstract method"
ENDCLASS.
CLASS LCL_MOCK_APPLICATION IMPLEMENTATION.
METHOD define_rules. "implement the abstract method"
       DATA:
       c_auth_object          TYPE xuobject VALUE 'S_DEVELOP',
       c_auth_devclass        TYPE xufield   VALUE 'DEVCLASS',
       c_auth_objtype         TYPE xufield   VALUE 'OBJTYPE',
       c_auth_objname         TYPE xufield   VALUE 'OBJNAME',
       c_auth_ACTVT           TYPE xufield   VALUE 'ACTVT',
       l_ref_obj_mock         TYPE REF TO if_sut_authority_mock_for_obj,
       l_ref_rule             TYPE REF TO if_sut_authority_mock_rule.
       l_ref_obj_mock =
          get_or_create_rule_for_object ( i_authority_object = c_auth_object ).
       "rule that package ABC shall be successful"
       l_ref_rule = l_ref_obj_mock-> add_rule ( i_subrc = 0 ).
       l_ref_rule-> add_id_value ( i_id = c_auth_devclass i_value = 'ABC' ).
       l_ref_rule-> add_id_value ( i_id = c_auth_objname i_value = '*' ).
       l_ref_rule-> add_id_value ( i_id = c_auth_objtype i_value = '*' ).
       l_ref_rule-> add_id_value ( i_id = c_auth_actvt i_value = '*' ).
       "all programs starting with A shall not be successful"
       l_ref_rule = l_ref_obj_mock-> add_rule ( i_subrc = 4 ).
       l_ref_rule-> add_id_value ( i_id = c_auth_devclass i_value = '*' ).
       l_ref_rule-> add_id_value ( i_id = c_auth_objname i_value = 'A*' ).
       l_ref_rule-> add_id_value ( i_id = c_auth_objtype i_value = 'PROG' ).
       l_ref_rule-> add_id_value ( i_id = c_auth_actvt i_value = '*' ).
```

Therefore, when the current values for the authority object 'S_DEVELOP' are compared to those defined by the above rules, if the ID field 'DEVCLASS' has a value='ABC' and the other ID fields have any values in the range specified by (using SET_PRIORITY( ) 266), determining matches (using MATCHES( ) 268) and processing the rules (using PROCESS( ) 254). This sequence of these operations is described below in regard to FIG. 3.

In an embodiment, execution of the application is modified (e.g., using the PROCESS( ) 254 method) based on a fail value (e.g., subrc=4) being registered for the authorization check for the user in regard to the object as a result of applying a matching rule. For example, a message requesting further information from the user may be displayed.

In an embodiment, at least one of the respective values specified by a rule, of the set of authorization rules, comprises a range of values as indicated by the value='*' in the above rule examples. Additionally, at least one of the respective values specified by a rule, of the set of authorization rules, comprises a dummy value indicating that the corresponding ID field is not being considered for corresponding authority-checks. As noted above, these dummy entries are needed to indicate that a corresponding ID field of the authority object has not been forgotten and is intentionally being ignored for this rule.

As is clear from the above example authorization rules, it is possible for the current values of the data fields of an authority object in an executing application to match the values specified by several of the rules associated with the authority object. For example, an authority object with ID field 'DEVCLASS'='ABC', ID field 'OBJNAME'='A*', ID field 'OBJTYPE' has a value='PROG' and the other ID fields having values='*' would satisfy both of the above example rules. In order to address this issue, each of the rules in the set of rules associated with the authority object may be assigned a priority value. The debugger script can then compare the current values for each of the data fields of the authority object to respective values specified by each rule in the set of rules associated with the authority object in order according to the priority value for each rule of the rules. In this way, when the current values for each of the data fields of the authority object match the values specified by a first matching rule of the set of rules, the result of the authorization check can be manipulated according to said first matching rule without having to compare the current values to any other values specified by the other rules of the set of rules.

CL_SUT_AUTHORITY_MOCK 230 serves as the rules evaluation processor so that the script can inject several rules for different authority objects and different specification/generalization levels with respect to the ID fields defined for an authority object. The priority specified during injection defines a processing order, i.e., the rules are processed with ascending priority order. If a rule matches, sy-subrc is set to the corresponding value and the rule processing by CL_SUT_AUTHORITY_MOCK 230 is terminated. The application itself continues executing normally up to the next authority-check occurrence, which triggers a breakpoint, which triggers execution of the script.

For example, if an authority-check for object ABC is reached, but no rules for this object exist, then execution of the application continues without any manipulation; however, if an authority-check for object S_DEVELOP is reached, rules do exist, which are processed in order based on priority. A first rule is checked: value of ID DEVCLASS for object S_DEVELOP does not match the value specified by the first rule for this ID field, therefore the method continues to the second rule and compares the ID fields to corresponding values specified by the second rule, and all ID values match. In response to the match, the method then executes a STEP OVER to progress the execution of the application to the code position right after the authority-check statement in order to avoid having to set up any system-level user profile. Instead the return code value SY-SUBRC for the skipped over authority-check is set to the value defined/specified in the matching rule (e.g., the second rule). The method then executes a CONTINUE (F8) to proceed execution of the application with the manipulated value for the authority-check. If no matching rule is found, the application is continued without any changes to the execution flow. This processing is done in the class method CL_SUT_AUTHORITY_MOCK 230 using the PROCESS_AUTHORITY_CHECK 234.

As an alternative (e.g., if the number or size of the rules makes it too cumbersome to define the rules within DEFINE_RULES 232), the class CL_MOCK_APPLICATION 240 may redefine the method PROCESS_AUTHORITY_OBJECT 236 and directly process the authority-check occurrence with application code. As input, the ID/VALUE pairs are passed for the ID fields of the authority object in the executing application.

Methods

Figure 3:
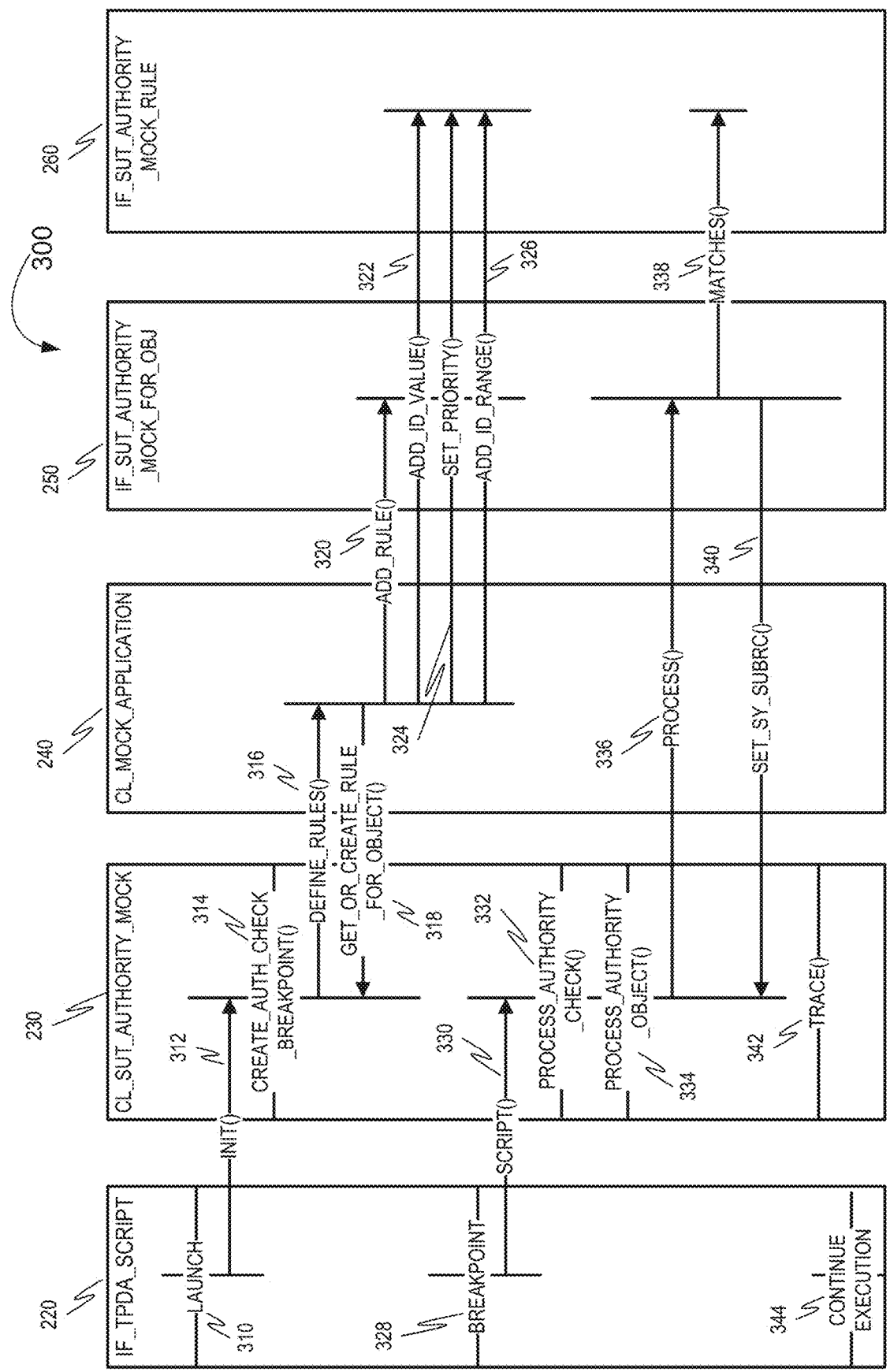
FIG. 3 is a ladder diagram illustrating a method, consistent with some embodiments, for using a debugger script controlled debugger session to assist in simulating application user authorization scenarios.

FIG. 3 is a ladder diagram illustrating a method 300, consistent with some embodiments, for using a debugger script controlled debugger session to assist in simulating application user authorization scenarios. The elements in FIG. 3 include elements from FIG. 2, which elements are labeled with the same identifiers.

At operation 310, a debugger script IF_TPDA_SCRIPT 220 is launched to assist in testing an executing application (e.g., application session 140). At operation 312, the INIT( ) 222 method is called to define the trigger points (e.g., breakpoints) of the script. The INIT( ) 222 method is implemented by the abstract super class CL_SUT_AUTHORITY_MOCK 230, which defines breakpoint (CREATE_AUTH_CHECK_BREAKPOINT( ) 244) at operation 314 and calls the abstract method DEFINE_RULES 232, at operation 316, for the subclass CL_MOCK_APPLICATION 240, which represents the application. At operation 318, CL_MOCK_APPLICATION 240 calls the method GET_OR_CREATE_RULE_FOR_OBJECT( ) 246 from the super class CL_SUT_AUTHORITY_MOCK 230 in order to obtain and/or generate rules for objects of the application. At operation 320, CL_MOCK_APPLICATION 240 calls the method ADD_RULE( ) for IF_SUT_AUTHORITY_MOCK_FOR_OBJ 250 to add a new authorization rule associated with an object of the application.

At operations 322, 324 and 326, the interface IF_SUT_AUTHORITY_MOCK_FOR_OBJ 250 calls ADD_ID_VALUE( ) 262, SET_PRIORITY( ) 266 and ADD_ID_RANGE( ) 264 for IF_SUT_AUTHORITY_MOCK_RULE 260 in order to set the particulars for the added rule. It is noted that these operations can be called in any order and for any number of rules to be added. The added ID field values or value ranges must be matched by corresponding values associated with a matching object of the executing application and the values specified by each rule are compared to the values of the object in an order that is based on the priority assigned to each rule associated with the object.

The debugger script IF_TPDA_SCRIPT 220 controls execution of the application which continues in a normal manner until it is determined that a breakpoint (injected by CREATE_AUTH_CHECK_BREAKPOINT( ) 244) has been reached at operation 328. The breakpoint indicates that the following statement comprises an authority-check and execution of the application is paused in order to check (e.g., using SCRIPT( ) 224 at operation 330) if the parameters of the authorization check match those of at least one rule associated with the authority object of the authority-check.

At operation 332, the authority object of the authority-check is determined using PROCESS_AUTHORITY_CHECK( ) 234. At operation 334, it is determined (using PROCESS_AUTHORITY_OBJECT( ) 236) whether at least one authorization rule associated with the authority object has been added; if not, the authorization check is executed normally and execution of the application continues to a next statement. If it is determined that the debugger does include a set of authorization rules associated with the authority object, then (using PROCESS_AUTHORITY_OBJECT( ) 236) a data structure of the object is accessed (e.g., from a system repository), the data structure comprising a set of ID fields, and current values for each of the ID fields are accessed (e.g., from application variables in a memory stack or heap).

At operation 336, the current values are compared (by calling PROCESS( ) 254 for IF_SUT_AUTHORITY_MOCK_FOR_OBJ 250) to the respective values specified by each rule of the set of authorization rules associated with the authority object in order of assigned priority. At operation 338, if there is a match (determined by calling MATCHES( ) 268 for IF_SUT_AUTHORITY_MOCK_RULE 260), then the result of the authorization check is manipulated at operation 340 (by calling SET_SY_SUBRC( ) 242 for CL_SUT_AUTHORITY_MOCK 230) as specified by the matching rule and no further rules of lower priority are checked.

At operation 342, CL_SUT_AUTHORITY_MOCK 230 can use the method TRACE( ) 238 to log all of the relevant data regarding the execution of the script as explained above. For example, the traced events could be: event where no rule was defined for a processed authority object; event where rules were defined for authority object xyz, but there was no match for given values of the ID fields of authority object xyz; event where there was a rule match for given values of the ID fields of authority object xyz and sy-subrc was set to the specified value (e.g., using SET_SY_SUBRC( ) 242). Corresponding log entries may be generated and connected with a corresponding code position. A script trace offers the chance to check the execution of the debugger script for errors. This script trace may be important, for example, to ensure a correct usage and processing of the script for plausibility and review/quality audit purposes.

At operation 344, the method 300 continues execution of the application normally until the next breakpoint is reached or the application ends (e.g., application session 140 terminates).

Figure 4:
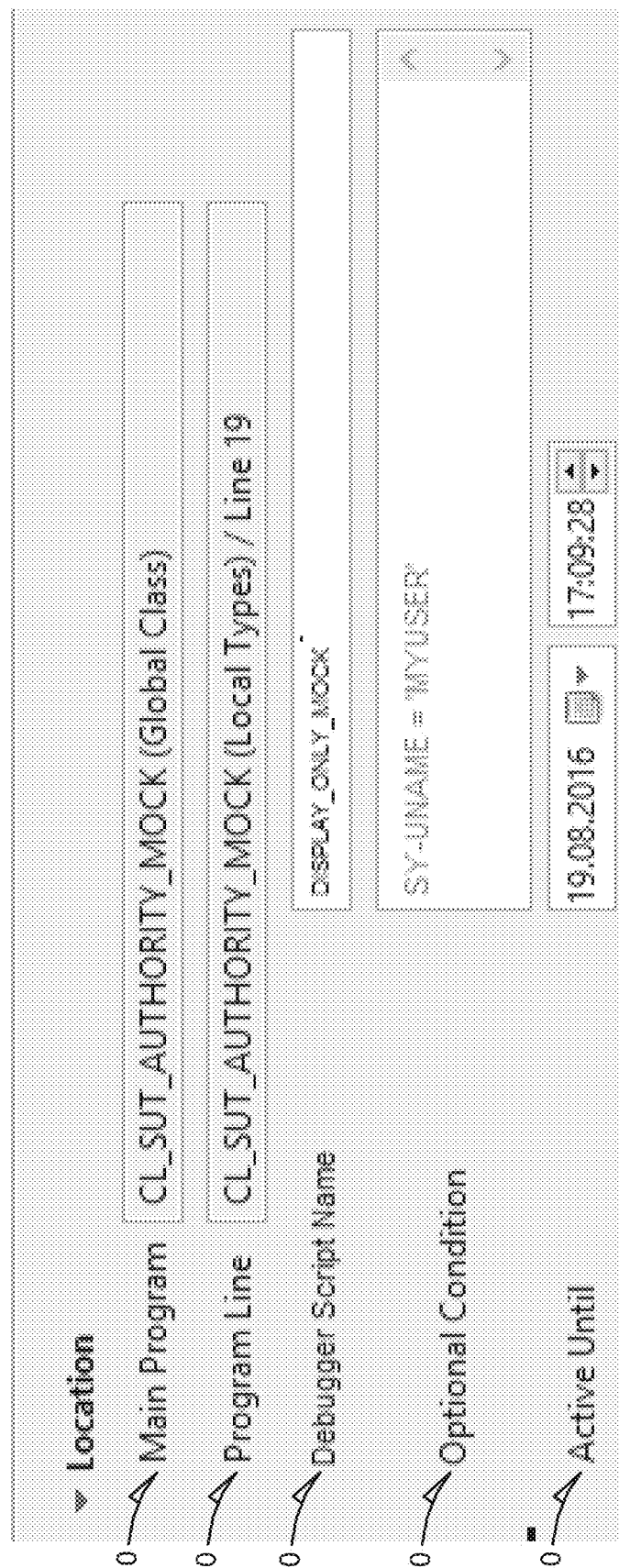
FIG. 4 shows a user interface, consistent with some embodiments, for configuring script-points for insertion into application source code.

FIG. 4 shows a user interface 400, consistent with some embodiments, for configuring script-points for insertion into application source code. The user interface 400 could be used as part of the method 600 of FIG. 6, consistent with some embodiments, for using a script-point to launch a debugger script controlled debugger session to assist in simulating application user authorization scenarios.

Script-points may be placed at certain appropriate code positions (e.g., initialization/prologue phase of an application). Every application has an initialization phase wherein elements of code, functionality, data and display that are absolutely required for the application to function are initialized (e.g., executed) before the application can do anything meaningful. Script-points are comparable to conventional breakpoints, but they do not stop the execution of the application within a debugger and instead they launch a specified debugger script controlled debugger session (a potentially "dark" session. e.g., not visible to a user) when it is reached. The creation of a script-point in a source code editor may be accomplished with user interface 400 as follows.

User interface 400 includes fields 410 and 420 for respectively specifying the application (e.g., Main Program CL_SUT_AUTHORITY_MOCK) and the location in the application (e.g., Program Line CL_SUT_AUTHORITY_MOCK/Line 19) at which the script-point will be inserted. The user interface 400 also includes field 430 for specifying the debugger script to be launched in a debugging session when the script-point is reached during execution of the application (e.g., DISPLAY_ONLY_MOCK). Furthermore, the user interface 400 also includes field 440 for specifying an optional condition (via an expression such as "SY-UNAME='MYUSER'") that must be satisfied in order for the debugger script controlled debugger session to be launched at the script-point. Finally, the script-point can be persistent so that its validity and life cycle are not restricted to the user session and can instead be controlled via field 450, which allows for a specified "Active Until" date and time to be specified. As a consequence of the above-noted configurations, a script-point may be used very flexibly: for a different/specified user, for a certain condition (e.g., request type, request parameter) or "darkly" for non-ABAP GUI applications (e.g., HTTP requests).

Figure 5:
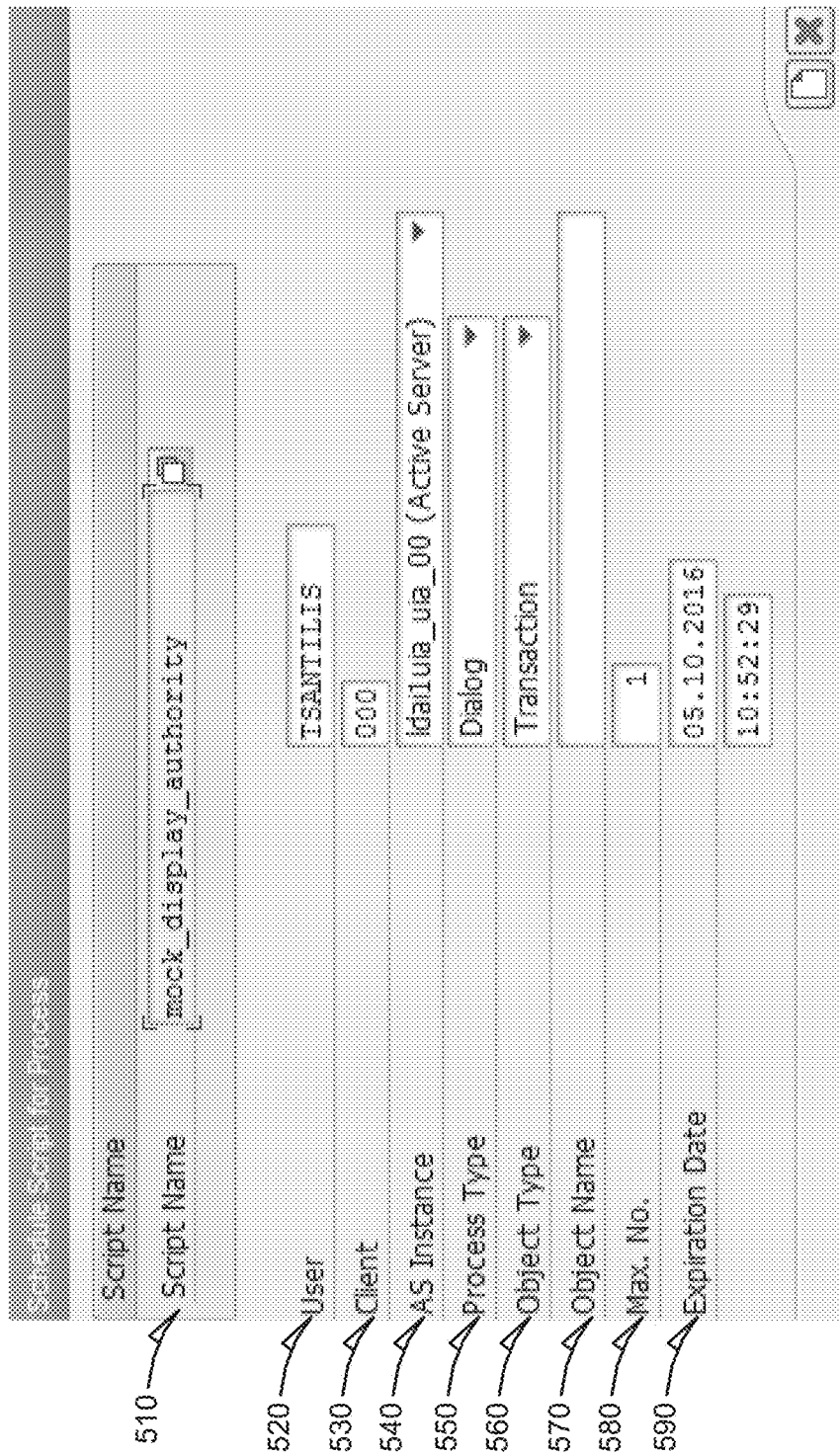
FIG. 5 shows a user interface, consistent with some embodiments, for scheduling the launch of a debugger script controlled debugger session at a system level.

FIG. 5 shows a user interface 500, consistent with some embodiments, for scheduling the launch of a debugger script controlled debugger session at a system level. The user interface 500 could be used to schedule the launch of a debugger script controlled debugger session for a process based on certain process properties being satisfied as an alternative to the method 600 of FIG. 6, consistent with some embodiments, for using a script-point to launch the debugger script controlled debugger session.

In some circumstances (e.g. a batch process) it might be difficult to add a script-point to the source code for a process. In such a circumstance, as an alternative, the debugger script controlled debugger session can be activated (e.g., launched) at system runtime level based on certain specified properties of the process being determined to have been satisfied. As noted above, the debugger script may be launched within a (potentially "dark", e.g., not visible to a user) debugger session when it is determined that the specified properties are satisfied for the process. The scheduling of the debugger script controlled debugger session launch based on determined process properties at a system level may be accomplished with user interface 500 as follows.

User interface 500 includes field 510 for specifying the script (e.g., Script Name "mock_display_authority") to be launched in a debugger session based on the process properties associated with fields 520-590, of user interface 500, being satisfied by an executing process (e.g., application session 140) of a system (e.g., system 100). The user interface 500 includes fields 520 and 530 for specifying a User "Tsantilis" and a Client "000" for which the debugger script controlled debugger session will be launched based on satisfaction of the process properties associated with fields 540-590, of user interface 500. The user interface 500 also includes field 540 for specifying the Application Server (AS) Instance "Idailuia_uia_00" on which the process must be executing for the debugger script controlled debugger session to be launched and field 550 for specifying a Process Type "Dialog" of the process for which the debugger script controlled debugger session will be launched.

Furthermore, the user interface 500 also includes fields 560 and 570 for specifying an Object Type "Transaction" and Object Name (not specified) of an object being manipulated by the process for which the debugger script controlled debugger session is to be launched. Finally, the scheduling of the debugger script controlled debugger session launch can be persistent so that its life cycle is not restricted to a user session and can instead be controlled via fields 580 and 590. Field 580 allows for a maximum number (Max. No. "1") of debugger script controlled debugger session launches to be specified and field 590 allows for a specified Expiration Date (and time) "05.10.2016" and "10:52:29" to be specified. As a consequence of the above-noted possible configurations, a script schedule may be used very flexibly: for a different/specified user, for a certain condition (e.g., process type, object type).

Figure 6:
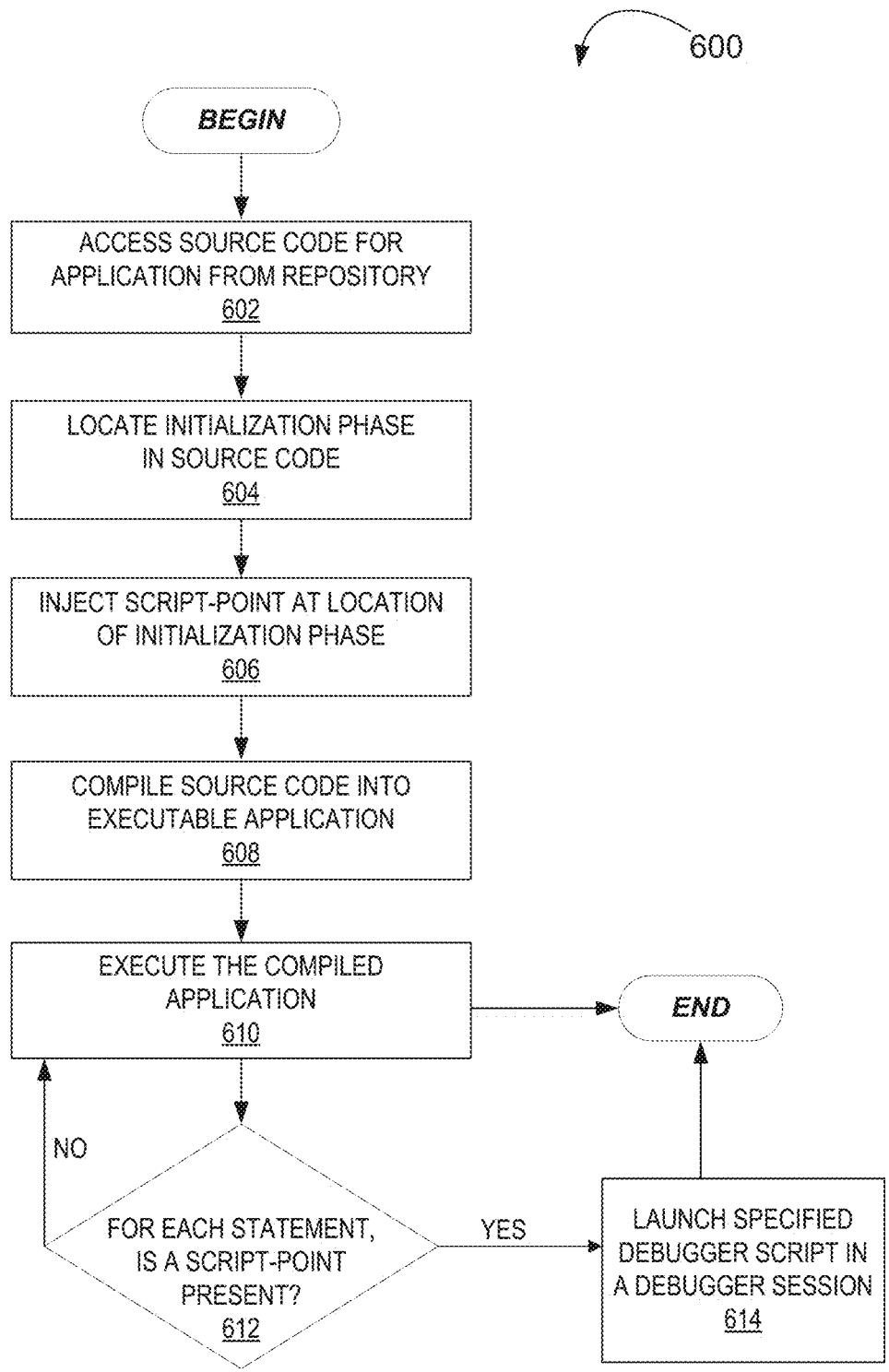
FIG. 6 is a flow diagram illustrating a method, consistent with some embodiments, for using a script-point to launch a debugger script controlled debugger session to assist in simulating application user authorization scenarios.

FIG. 6 is a flow diagram illustrating a method 600, consistent with some embodiments, for using a script-point to launch debugger script controlled debugger session to assist in simulating application user authorization scenarios.

At operation 602, the system may access source code for an application, for example from application repository 180 of FIG. 1. At operation 604, an instance of code in the source code corresponding to an initialization phase of the application is located (e.g., via semantic analysis). At operation 606, a script-point (e.g., as described above) may be inserted into the source code at the location in the source code corresponding to an initialization phase of the application. At operation 608, the modified source code, including the script-point, is compiled into an executable application. At operation 610, the executable application can then be executed normally (e.g., not in a debugging session) and a debugger script controlled debugger session (e.g., as specified by the script-point) will be independently launched, at operation 612, when the script-point is reached during the execution of the executable application. The launched debugger script controlled debugger session may then process (as described above with respect to FIGS. 2 and 3) the authorization checks reached during execution of the application in the launched debugger session. The method 600 may end based on the execution of the application having ended.

Figure 7:
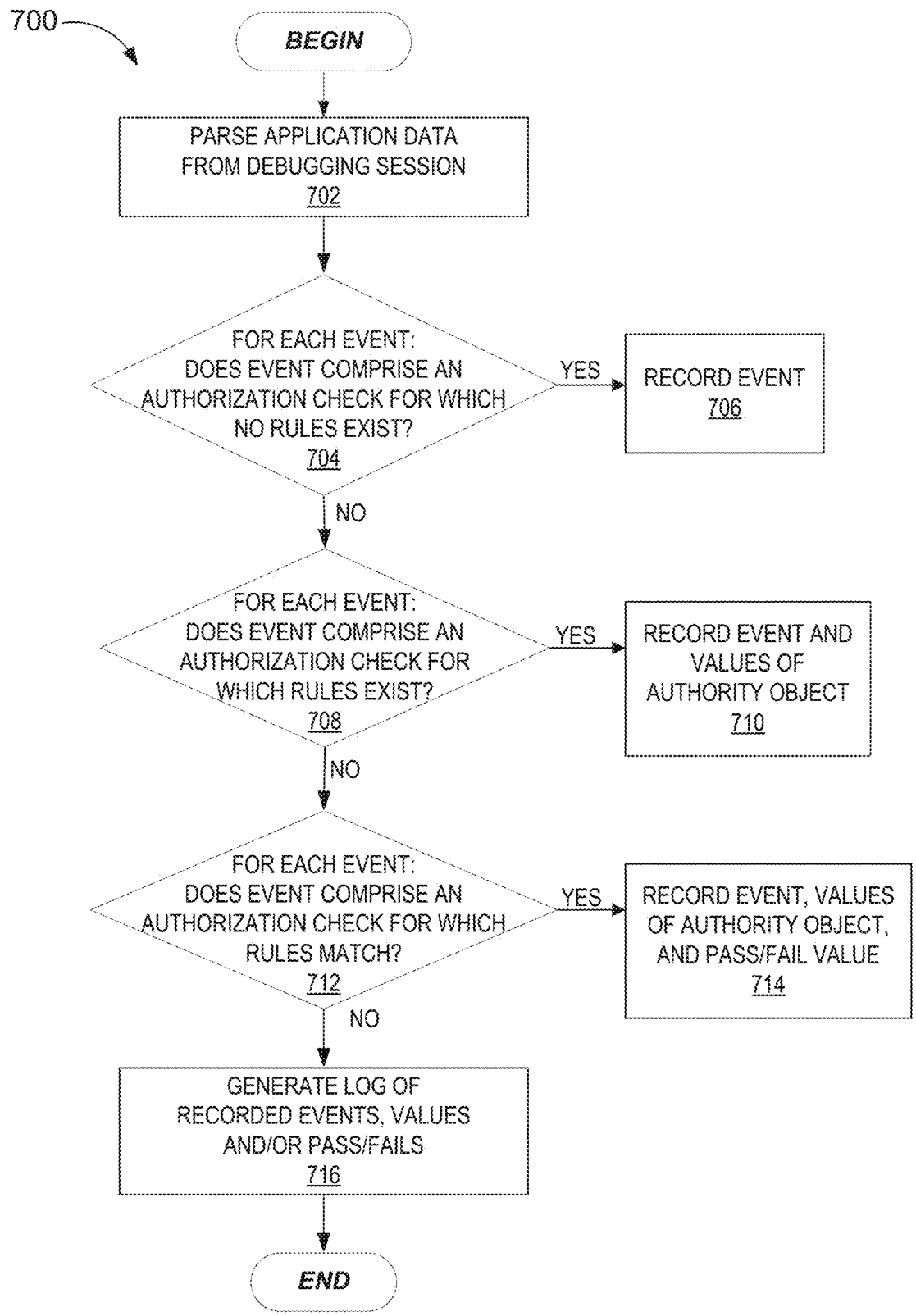
FIG. 7 is a flow diagram illustrating a method, consistent with some embodiments, for using a script trace to log events associated with the use of a debugger script controlled debugger session to assist in simulating application user authorization scenarios.

FIG. 7 is a flow diagram illustrating a method 700, consistent with some embodiments, for using a script trace to log events associated with the use of debugger script controlled debugger session to assist in simulating application user authorization scenarios.

At operation 702, the system (e.g., ABAP system) makes use of an event tracing functionality (e.g., ABAP Trace) for generating a log associated with the execution of an application in a debugging session by first parsing the data associated with the execution of the application in the debugging session. At operation 704, it is determined for each statement of the application, based on the parsed data, whether the statement comprises an authorization check for a user in regard to an object of the application wherein the debugger does not include a set of authorization rules associated with the object. If so, the method 700 continues to operation 706 and records the event (e.g., records location of statement and authority object). If not, method 700 continues to operation 708.

At operation 708, it is determined for each statement of the application, based on the parsed data, whether the statement comprises an authorization check for a user in regard to an object of the application wherein the debugger does include a set of authorization rules associated with the object, but current values of the data fields of the object did not match values specified by at least one of the rules of the set of rules. If so, the method 700 continues to operation 710 and records the event and the values of the authority object (e.g., records location of statement, authority object and values of data fields that were checked against the rules). If not, the method 700 continues to operation 712.

At operation 712, it is determined for each statement of the application, based on the parsed data, whether the statement comprises an authorization check for a user in regard to an object of the application wherein the debugger does include a set of authorization rules associated with the object, the current values of the data fields of the object do match values specified by at least one of the rules, and a pass or fail value has been registered for the authorization check in the executing application according to the at least one matching rule. If so, the method 700 continues to operation 714 and records the event, the values of the authority object, and the pass or fail (e.g., records location of statement, authority object, values of data fields that were checked against the rules and the pass or fail value registered for the authorization check).

At operation 716, the system generates a log of all of the recorded data from operations 706, 710 and 714 of the method 700 in order to provide a record of the execution of the debugging session that can be used to spot errors in the functioning of debugger scripts used during the debugging session.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-7 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the subject matter in different contexts from the disclosure contained herein.

Software Architecture

Figure 8:
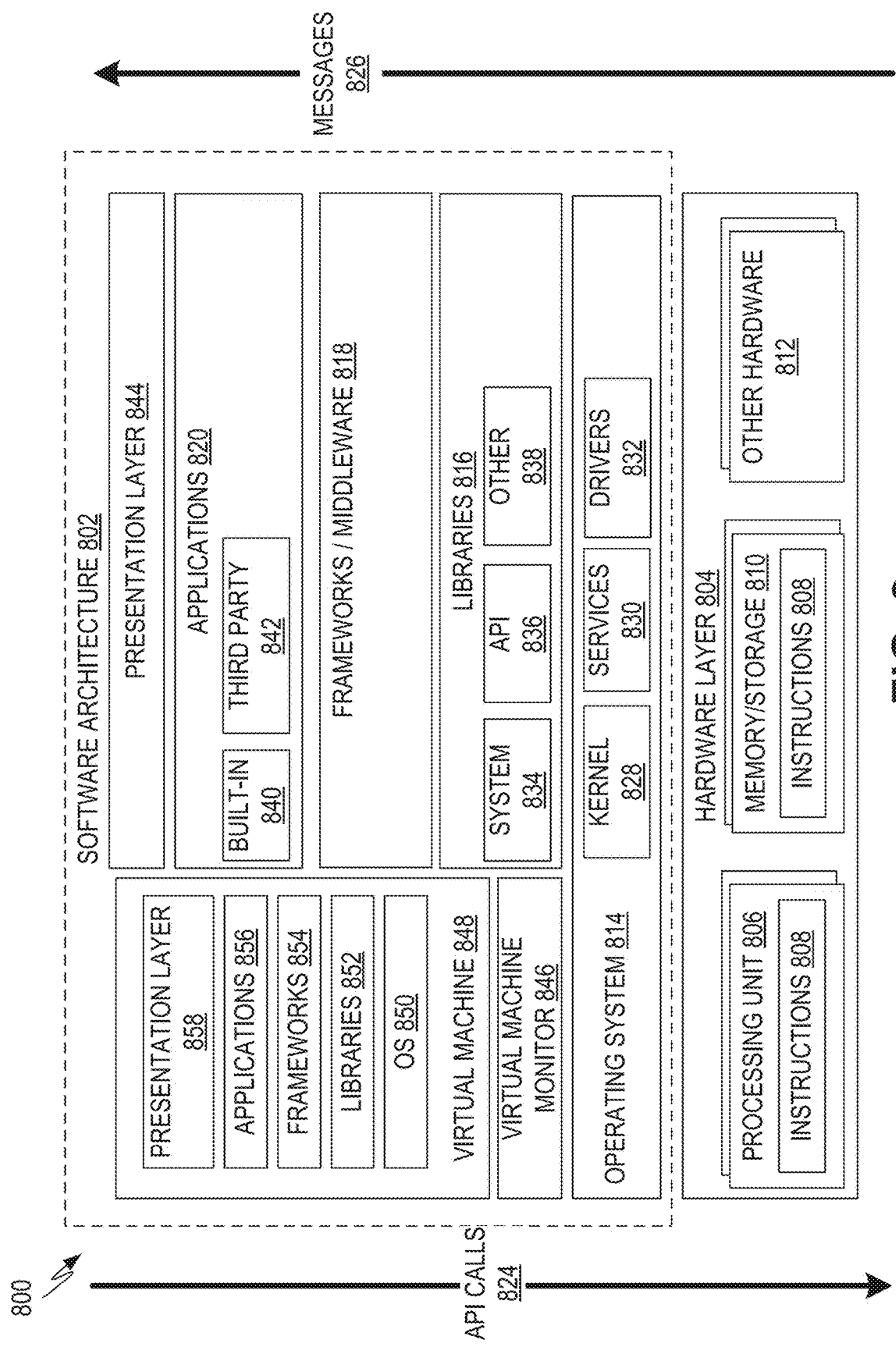
FIG. 8 is a block diagram illustrating an example of a software architecture that may be installed on a machine, according to some example embodiments.

FIG. 8 is a block diagram 800 illustrating an example of a software architecture 802 that may be installed on a machine, according to some example embodiments. FIG. 8 is merely a non-limiting example of a software architecture, and it will be appreciated that many other architectures may be implemented to facilitate the functionality described herein. The software architecture 802 may be executing on hardware such as a machine 900 of FIG. 9 that includes, among other things, processors 910, memory/storage 930, and I/O components 950. A representative hardware layer 804 is illustrated and can represent, for example, the machine 900 of FIG. 9. The representative hardware layer 804 comprises one or more processing units 806 having associated executable instructions 808. The executable instructions 808 represent the executable instructions of the software architecture 802, including implementation of the methods, modules, and so forth of FIGS. 1-7. The hardware layer 804 also includes memory or storage modules 810, which also have the executable instructions 808. The hardware layer 804 may also comprise other hardware 812, which represents any other hardware of the hardware layer 804, such as the other hardware illustrated as part of the machine 900.

In the example architecture of FIG. 8, the software architecture 802 may be conceptualized as a stack of layers, where each layer provides particular functionality. For example, the software architecture 802 may include layers such as an operating system 814, libraries 816, frameworks/middleware 818, applications 820, and a presentation layer 844. Operationally, the applications 820 or other components within the layers may invoke API calls 824 through the software stack and receive a response, returned values, and so forth (illustrated as messages 826) in response to the API calls 824. The layers illustrated are representative in nature, and not all software architectures have all layers. For example, some mobile or special purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, or a game application. The third-party applications 842 may include any of the built-in applications 840, as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 842 may invoke the API calls 824 provided by the mobile operating system such as the operating system 814 to facilitate functionality described herein.

The applications 820 may utilize built-in operating system functions (e.g., kernel 828, services 830, or drivers 832), libraries (e.g., system libraries 834, API libraries 836, and other libraries 838), or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with the user.

Some software architectures utilize virtual machines. In the example of FIG. 8, this is illustrated by a virtual machine 848. A virtual machine creates a software environment where applications/modules can execute as if they were executing on a hardware machine (e.g., the machine 900 of FIG. 9, for example). A virtual machine 848 is hosted by a host operating system (e.g., operating system 814) and typically, although not always, has a virtual machine monitor 846, which manages the operation of the virtual machine 848 as well as the interface with the host operating system (e.g., operating system 814). A software architecture executes within the virtual machine 848, such as an operating system 850, libraries 852, frameworks/middleware 854, applications 856, or a presentation layer 858. These layers of software architecture executing within the virtual machine 848 can be the same as corresponding layers previously described or may be different.

Machine Architecture and Machine-Readable Medium

Figure 9:
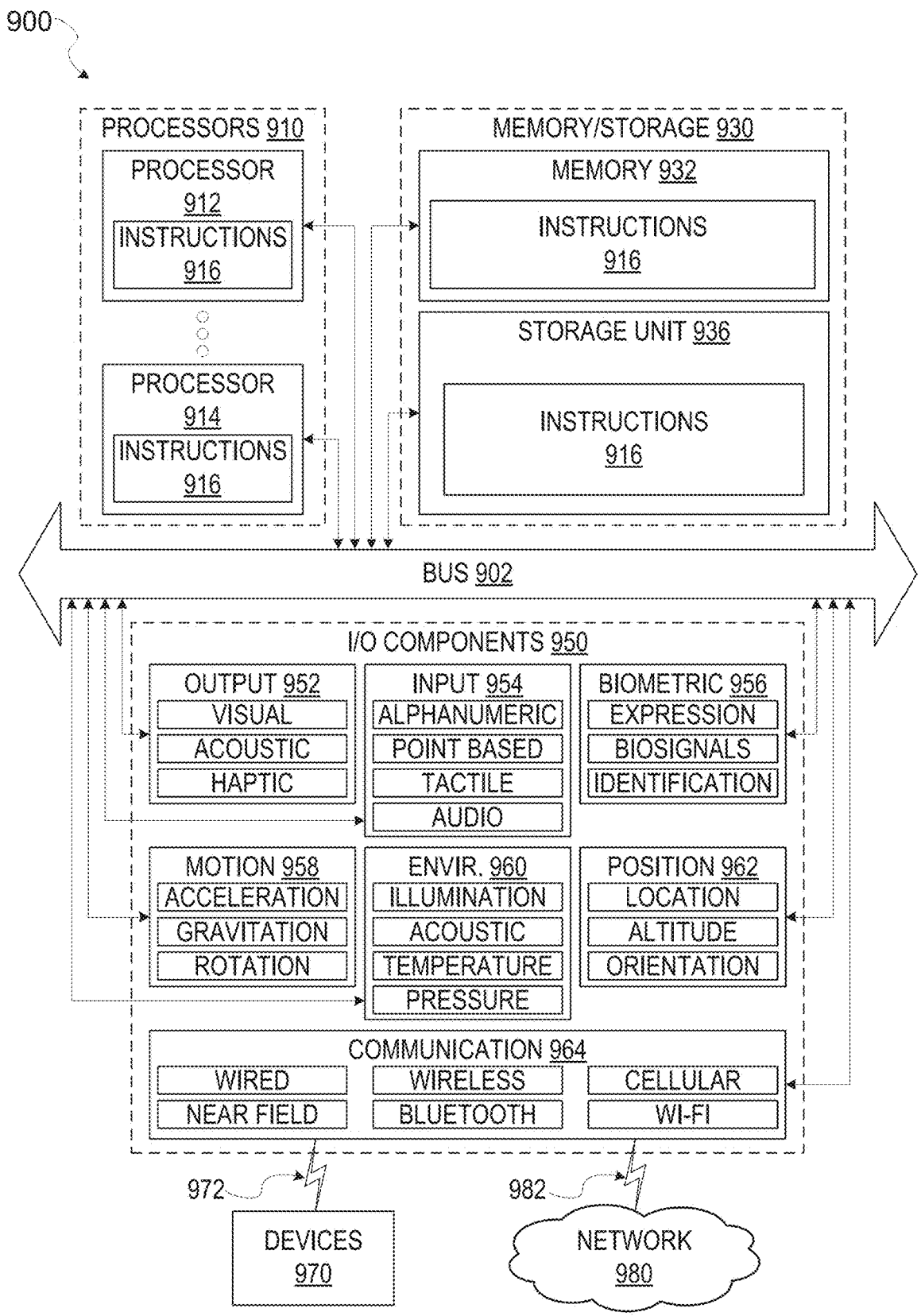
FIG. 9 illustrates a diagrammatic representation of a machine in the form of a computer system within which a set of instructions may be executed for causing the machine to perform any one or more of the methodologies discussed herein.

FIG. 9 illustrates a diagrammatic representation of a machine in the form of a computer system within which a set of instructions may be executed for causing the machine to perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute the method 700 of FIG. 7. Additionally, or alternatively, the instructions 916 may implement FIGS. 1-7, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and the memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine (e.g., processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code. Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising a processor and a memory coupled to the processor, the memory including instructions which, when executed by the processor, cause the system to perform operations comprising:
   executing an application, comprising statements and objects, one statement at a time using a debugger;
   for each statement reached during the execution of the application, before execution of each statement, detecting whether the statement of the application comprises an authorization check;
   discontinuing execution of the application based on detecting that the statement of the application comprises the authorization check;
   analyzing the statement comprising the authorization check to determine an authority object associated with the authorization check;
   determining that the debugger includes a set of authorization rules associated with the authority object indicating that the authorization check is to be manipulated to simulate authorization;
   accessing, from a system repository, a data structure of the authority object, the data structure comprising a set of data fields;
   comparing current values of each data field in the set of data fields to respective values specified by each rule of the set of authorization rules associated with the authority object to determine whether the current values of each data field in the set of data fields match any respective values specified by any rule of the set of authorization rules;
based on determining that the current values of each data field in the set of data fields do not match any respective values specified by any rules of the set of authorization rules, executing the statement of the application that comprises the authorization check and resuming execution of the application, one statement at a time using the debugger;
based on determining that the current values of each data field in the set of data fields do match any respective values specified by a first authorization rule, manipulating the authorization check for the authority object according to the first authorization rule to simulate authorization by performing operations comprising:
  skipping over the statement of the application comprising the authorization check for the authority object such that the statement of the application comprising the authorization check is not executed;
  manipulating the authorization check to set a pass value or to set a fail value based on a value specified by the first authorization rule using the current values of each data field in the set of data fields of the data structure of the authority object;
  registering the pass or fail value for the authorization check in the executing application according to the first authorization rule; and
  resuming execution of the application, one statement at a time using the debugger.

2. The system of claim 1, the operations further comprising modifying execution of the application based on a fail value being registered for the authorization check.

3. The system of claim 1, wherein at least one of the values specified by the first at least one authorization rule comprises a range of values.

4. The system of claim 1, wherein at least one of the values specified by the first authorization rule comprises a dummy value.

5. The system of claim 1, wherein the set of authorization rules the operations further comprise:
  accessing a priority value for each rule of the set of authorization rules;
  comparing current values of each data field in the set of data fields to respective values specified by each rule of the set of authorization rules associated with the authority object to determine whether the current values of each data field in the set of data fields match any respective values specified by any rule of the set of authorization rules, in an order according to the priority value for each rule of the set of authorization rules; and
  based on the current values matching values specified by the first rule of the set of authorization rules, not comparing the current values to any other values specified by a rule of the set of authorization rules.

6. The system of claim 1, the operations further comprising:
  generating a log associated with the execution of the application, the log containing entries for at least one of the following:
  each statement of the application comprising an authorization check for an authority object wherein the debugger did not include any authorization rules associated with the authority object;
  each statement comprising an authorization check for an authority object wherein the debugger does include at least one authorization rule associated with the authority object, but current values of the data fields in the data structure of the authority object did not match values specified by the at least one authorization rule; and
  each statement comprising an authorization check for an authority object wherein the debugger does include at least one authorization rule associated with the authority object, the current values of the data fields did match values specified by the at least one authorization rule and a pass or fail value has been registered for the authorization check in the executing application according to the at least one authorization rule.

7. The system of claim 1, the operations further comprising:
  accessing source code for the application;
  locating an instance of code in the source code corresponding to an initialization phase of the application;
  adding a script-point at the location of the instance of code;
  compiling the source code into an executable application;
  executing the executable application; and
  launching a debugger script controlled debugger session based on the script-point being reached during the execution of the executable application;
  wherein the debugger script processes authorization checks reached during the execution of the executable application in the debugger session.

8. A method comprising:
  executing an application, comprising statements and objects, one statement at a time using a debugger;
  for each statement reached during the execution of the application, before execution of each statement, detecting whether the statement of the application comprises an authorization check;
  discontinuing execution of the application based on detecting that the statement of the application comprises the authorization check;
  analyzing the statement comprising the authorization check to determine an authority object associated with the authorization check;
  determining that the debugger includes a set of authorization rules associated with the authority object indicating that the authorization check is to be manipulated to simulate authorization;
  accessing, from a system repository, a data structure of the authority object, the data structure comprising a set of data fields;
  comparing current values of each data field in the set of data fields to respective values specified by each rule of the set of authorization rules associated with the authority object to determine whether the current values of each data field in the set of data fields match any respective values specified by any rule of the set of authorization rules;
  based on determining that the current values of each data field in the set of data fields do not match any respective values specified by any rules of the set of authorization rules, executing the statement of the application that comprises the authorization check and resuming execution of the application, one statement at a time using the debugger;
  based on determining that the current values of each data field in the set of data fields do match any respective values specified by a first authorization rule, manipulating the authorization check for the authority object according to the first authorization rule to simulate authorization by performing operations comprising:
  skipping over the statement of the application comprising the authorization check for the authority object such that the statement of the application comprising the authorization check is not executed;
  manipulating the authorization check to set a pass value or to set a fail value based on a value specified by the first authorization rule using the current values of each data field in the set of data fields of the data structure of the authority object;
  registering the pass or fail value for the authorization check in the executing application according to the first authorization rule; and
  resuming execution of the application, one statement at a time using the debugger.

9. The method of claim 8, further comprising modifying execution of the application based on a fail value being registered for the authorization check.

10. The method of claim 8, wherein at least one of the values specified by the first authorization rule comprises a range of values.

11. The method of claim 8, wherein at least one of the values specified by the first authorization rule comprises a dummy value.

12. The method of claim 8, wherein the set of authorization rules the operations further comprise:
  accessing a priority value for each rule of the set of authorization rules;
  comparing current values of each data field in the set of data fields to respective values specified by each rule of the set of authorization rules associated with the authority object to determine whether the current values of each data field in the set of data fields match any respective values specified by any rule of the set of authorization rules, in an order according to the priority value for each rule of the set of authorization rules; and
  based on the current values matching values specified by the first rule of the set of authorization rules, not comparing the current values to any other values specified by a rule of the set of authorization rules.

13. The method of claim 8, generating a log associated with the execution of the application, the log containing entries for at least one of the following:
  each statement of the application comprising an authorization check for an authority object wherein the debugger did not include any authorization rules associated with the authority object;
  each statement comprising an authorization check for an authority object wherein the debugger does include at least one authorization rule associated with the authority object, but current values of the data fields in the data structure of the authority object did not match values specified by the at least one authorization rule; and
  each statement comprising an authorization check for an authority object wherein the debugger does include at least one authorization rule associated with the authority object, the current values of the data fields did match values specified by the at least one authorization rule and a pass or fail value has been registered for the authorization check in the executing application according to the at least one authorization rule.

14. The method of claim 8, further comprising:
  accessing source code for the application;
  locating an instance of code in the source code corresponding to an initialization phase of the application;
  adding a script-point at the location of the instance of code;
  compiling the source code into an executable application;
  executing the executable application; and
  launching a debugger script controlled debugger session based on the script-point being reached during the execution of the executable application;
  wherein the debugger script processes authorization checks reached during the execution of the executable application in the debugger session.

15. A non-transitory machine-readable storage medium storing instructions which, when executed by at least one processor of a machine, cause the machine to perform operations comprising:
  executing an application, comprising statements and objects, one statement at a time using a debugger;
  for each statement reached during the execution of the application, before execution of each statement, detecting whether the statement of the application comprises an authorization check;
  discontinuing execution of the application based on detecting that the statement of the application comprises the authorization check;
  analyzing the statement comprising the authorization check to determine an authority object associated with the authorization check;
  determining that the debugger includes a set of authorization rules associated with the authority object indicating that the authorization check is to be manipulated to simulate authorization;
  accessing, from a system repository, a data structure of the authority object, the data structure comprising a set of data fields;
  comparing current values of each data field in the set of data fields to respective values specified by each rule of the set of authorization rules associated with the authority object to determine whether the current values of each data field in the set of data fields match any respective values specified by any rule of the set of authorization rules;
  based on determining that the current values of each data field in the set of data fields do not match any respective values specified by any rules of the set of authorization rules, executing the statement of the application that comprises the authorization check and resuming execution of the application, one statement at a time using the debugger;
  based on determining that the current values of each data field in the set of data fields do match any respective values specified by a first authorization rule, manipulating the authorization check for the authority object according to the first authorization rule to simulate authorization by performing operations comprising:
    skipping over the statement of the application comprising the authorization check for the authority object such that the statement of the application comprising the authorization check is not executed;
    manipulating the authorization check to set a pass value or to set a fail value based on a value specified by the first authorization rule using the current values of each data field in the set of data fields of the data structure of the authority object;

registering the pass or fail value for the authorization check in the executing application according to the first authorization rule; and resuming execution of the application, one statement at a time using the debugger.

16. The storage medium of claim 15, further comprising modifying execution of the application based on a fail value being registered for the authorization check.

17. The storage medium of claim 15, wherein:
at least one of the values specified by the first authorization rule comprises a range of values; and/or
at least one of the values specified by the first authorization rule comprises a dummy value.

18. The storage medium of claim 15, wherein the set of authorization rules the operations further comprise:
accessing a priority value for each rule of the set of authorization rules;
comparing current values of each data field in the set of data fields to respective values specified by each rule of the set of authorization rules associated with the authority object to determine whether the current values of each data field in the set of data fields match any respective values specified by any rule of the set of authorization rules, in an order according to the priority value for each rule of the set of authorization rules; and
based on the current values matching values specified by the first rule of the set of authorization rules, not comparing the current values to any other values specified by a rule of the set of authorization rules.

19. The storage medium of claim 15, the operations further comprising generating a log associated with the execution of the application, the log containing entries for at least one of the following:

each statement of the application comprising an authorization check for an authority object wherein the debugger did not include any authorization rules associated with the authority object;

each statement comprising an authorization check for an authority object wherein the debugger does include at least one authorization rule associated with the authority object, but current values of the data fields in the data structure of the authority object did not match values specified by the at least one authorization rule; and each statement comprising an authorization check for an authority object wherein the debugger does include at least one authorization rule associated with the authority object, the current values of the data fields did match values specified by the at least one authorization rule and a pass or fail value has been registered for the authorization check in the executing application according to the at least one authorization rule.

20. The storage medium of claim 15, the operations further comprising:
accessing source code for the application;
locating an instance of code in the source code corresponding to an initialization phase of the application;
adding a script-point at the location of the instance of code;
compiling the source code into an executable application;
executing the executable application; and
launching a debugger script controlled debugger session based on the script-point being reached during the execution of the executable application;
wherein the debugger script processes authorization checks reached during the execution of the executable application in the debugger session.

* * * * *